Aug. 13, 1946.  C. M. JAMESON  2,405,698
DOG CLUTCH
Original Filed Sept. 24, 1942
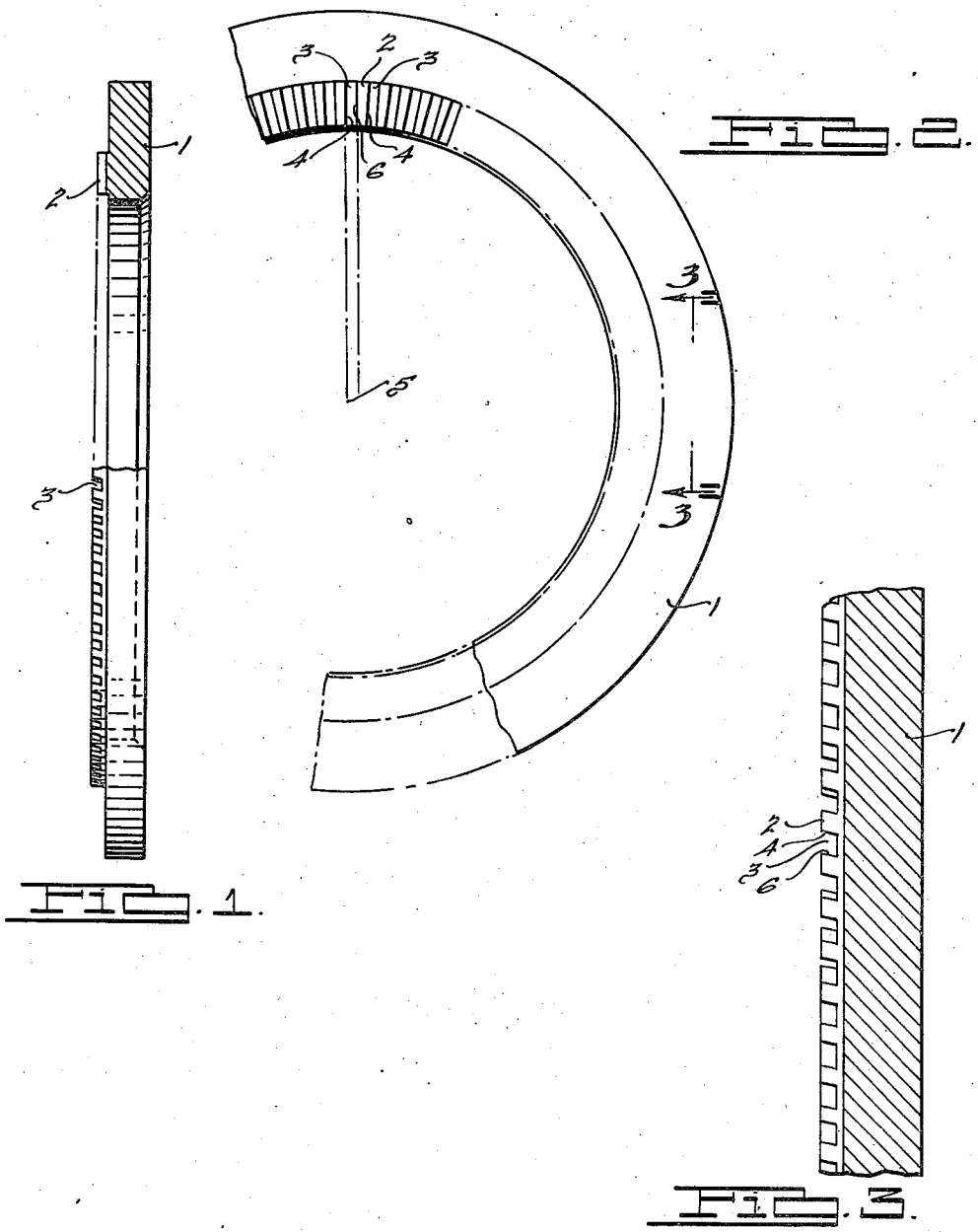
INVENTOR.
Charles M. Jameson.
Harness, Dickey & Pierce.
ATTORNEYS.

Patented Aug. 13, 1946

2,405,698

UNITED STATES PATENT OFFICE 2,405,698

DOG CLUTCH

Charles M. Jameson, Battle Creek, Mich.

Original application September 24, 1942, Serial No. 459,536. Divided and this application April 23, 1945, Serial No. 589,776

2 Claims. (Cl. 192—67)

This invention relates to an improved and simplified dog clutch construction, and this application is a division of applicant's copending application, Serial No. 459,536, filed September 24, 1942.

It is the general object of the present invention to provide an improved form of tooth construction for a dog clutch which is subject to a torque loading in only one direction, which construction is characterized by the fact that it may be machined with much less difficulty than prior clutch tooth constructions and by the fact that identically constructed clutch members will mate properly.

Other objects and advantages of the invention will become apparent from the following specification, the accompanying drawing, and the appended claims.

In the drawing

Figure 1 is a side elevation, partly in section, of one of a pair of dog clutch members constructed in accordance with the present invention;

Figure 2 is a fragmentary face view of the improved dog clutch member; and

Figure 3 is an enlarged fragmentary section taken on the line 3—3 of Figure 2.

The conventional practice in the past in constructing dog clutch teeth has been to provide teeth having opposite faces which extend radially. As a result, the teeth, as well as the tooth spaces, increase in width from their inner to their outer edges. Accordingly, it has been necessary to perform two machining operations to cut each tooth space, one for each side of the space. In accordance with the present invention the number of separate machining operations required to finish each tooth space is reduced to one, by machining tooth spaces between the teeth which are of uniform width throughout their radial extent and by making one side of each tooth space extend radially with respect to the axis of the clutch member. When two identical clutch members so constructed are positioned face to face with the teeth intermeshing, it will be found that the teeth on the respective clutch members make an effective surface engagement for the transmission of torque in one direction.

In the drawings, the invention is illustrated in connection with a dog clutch member in the form of a ring 1 having a plurality of dog clutch teeth 2. The teeth are separated by spaces 3. As best shown in Figure 2, the tooth space 3 is of uniform width and the teeth 2 are tapered in width, being narrower at their inner ends. The tooth space 3 may be made by milling or otherwise machining a slot of uniform width and with one face of the slot or tooth space, namely, the face 4, extending radially with respect to the axis 5 of the dog clutch member. The opposite side 6 of the tooth space is parallel to the side 4. Each of the remaining tooth spaces is similarly machined with its corresponding face extending in a line radially with respect to the axis of the clutch member and its opposite face parallel to the first face. The maximum tooth width must, of course, be slightly less than the width of the tooth spaces.

An important feature of the invention resides in the fact that, if two identical clutch members are made up in the manner described above it will be found that the respective radially extending tooth faces, such as faces 4, mate perfectly and hence are fully effective to transmit torque in one direction. Hence, the same machine setup may be employed to machine both members of a pair. The opposite sides of the teeth will not mate properly and, therefore, the mechanism is not adapted for use where a reverse torque will be encountered.

The principles and advantages of the invention may be fully realized regardless of the angle between the sides of the teeth and a plane at right angles to the axis of the clutch member. Thus, in the embodiment of the invention illustrated in Figures 1 and 2, the side edges 4 and 6 of the tooth spaces need not be normal to the plane of the clutch ring 1 but may extend at a slight angle, as shown in Figure 3, such that a torque loading on the teeth will have a tendency to separate the clutch members. The angle between the load carrying clutch tooth faces and a normal to the plane of the clutch member may be less than the angle of repose, in which event the torque loading would not actually separate the teeth, or slightly greater than the angle of repose in which event the torque loading would actually effect a separation, depending upon the mode of operation desired. It should be noted that when the load carrying tooth faces are inclined at an angle to a normal to the plane of the clutch member, the median line in the clutch tooth load carrying face parallel to the plane of the clutch member should be radial with respect to the axis of the clutch member, and all other lines in that face and parallel to the plane of the clutch member should be parallel to the median line.

It will be appreciated that aside from the location of the load carrying sides of the teeth and the fact that the tooth spaces are of uniform width, the design and construction of the clutch members may be varied as desired.

What is claimed is:

1. A dog clutch comprising a pair of clutch elements having a plurality of annularly arranged teeth adapted to mesh with each other, the spaces between said teeth being straight slots of uniform width and each tooth having one load carrying side, the contacting load carrying sides of each pair of engaged teeth on the respective clutch elements lying in a common plane when the clutch elements are engaged.

2. A dog clutch member comprising an element having a plurality of annularly arranged teeth, the spaces between said teeth being straight slots of uniform width and the line of intersection between one side of each tooth space and a plane perpendicular to the axis of the clutch member being radial with respect to the axis of the element.

CHARLES M. JAMESON.